United States Patent
Jayaram et al.

(10) Patent No.: US 8,023,497 B2
(45) Date of Patent: Sep. 20, 2011

(54) METHOD AND APPARATUS FOR DYNAMIC ANCHORING OF CS CALLS FOR CS-TO-VOIP HANDOFFS

(75) Inventors: Ranjith Jayaram, San Diego, CA (US); Arnaud Meylan, San Diego, CA (US); Kirti Gupta, San Diego, CA (US); Manoj M. Deshpande, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 415 days.

(21) Appl. No.: 11/540,360

(22) Filed: Sep. 29, 2006

(65) Prior Publication Data

US 2007/0248079 A1 Oct. 25, 2007

Related U.S. Application Data

(60) Provisional application No. 60/793,405, filed on Apr. 19, 2006.

(51) Int. Cl.
*H04L 12/66* (2006.01)
*H04W 36/00* (2009.01)

(52) U.S. Cl. .................................. 370/352; 455/436

(58) Field of Classification Search .................. None
See application file for complete search history.

(56) References Cited

U.S. PATENT DOCUMENTS

| | | | |
|---|---|---|---|
| 2003/0108002 A1* | 6/2003 | Chaney et al. | 370/261 |
| 2004/0249887 A1* | 12/2004 | Garcia-Martin et al. | 709/204 |
| 2006/0286984 A1* | 12/2006 | Bonner | 455/445 |
| 2006/0291419 A1* | 12/2006 | McConnell et al. | 370/331 |
| 2007/0014281 A1 | 1/2007 | Kant | |
| 2007/0070948 A1* | 3/2007 | Kezys et al. | 370/331 |
| 2007/0123259 A1* | 5/2007 | Huang et al. | 455/436 |

FOREIGN PATENT DOCUMENTS

| | | |
|---|---|---|
| WO | WO0131939 | 5/2001 |
| WO | WO0131963 A1 | 5/2001 |
| WO | WO2006105223 | 10/2006 |

OTHER PUBLICATIONS

3GPP TR 23806 V700, Technical Specification Group Services and System Aspects.
Voice Call Continuity between CS and IMS study Dec. 15, 2005, XP002438622.
International Search Report and Written Opinion—PCT/US2007/066800, International Search Authority—European Patent Office—Jan. 17, 2008.

* cited by examiner

*Primary Examiner* — Hassan Phillips
*Assistant Examiner* — Eunsook Choi
(74) *Attorney, Agent, or Firm* — Peng Zhu; Abdollah Ketbab (57) ABSTRACT

A mobile device that is capable of accessing different types of networks such as a circuit-switched network and a packet-switched network is disclosed. A dynamic anchoring mechanism is invoked when the mobile device determines that a circuit-switched call is to be handed over to a packet-switched network.

62 Claims, 6 Drawing Sheets

METHOD AND APPARATUS FOR DYNAMIC ANCHORING OF CS CALLS FOR CS-TO-VOIP HANDOFFS

CROSS REFERENCE TO RELATED APPLICATIONS

This application claims the benefit of the filing date of U.S. provisional application 60/793,405, filed on Apr. 19, 2006, entitled "Dynamic Anchoring of CS Calls for CS-to-VoIP Handoffs," which is herein incorporated in reference by its entirety.

BACKGROUND

1. Field

The present disclosure relates generally to telecommunications, and more particularly, to systems and methods to support a mobile communications device capable of communicating via at least two different types of communications networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between circuit-switched networks (e.g., circuit-switched cellular networks) and packet-switched networks (e.g., packet-switched cellular networks, wireless LANs, etc.). wireless LANs (WLANs) may provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks such as packet-switched networks and circuit-switched networks. Accordingly, there are now instances in which a session initiated by a mobile device over a circuit-switched network may need to be handed off to a packet-switched network. A session may be a simple two-way telephone call, a collaborative multi-media conference session, or the like. There exists the need, therefore, to accomplish such handoffs in a manner that efficiently utilizes the resources of the networks.

SUMMARY

In one aspect, a method for processing a session associated with a mobile device capable of communicating over at least two networks is provided. During an active circuit-switched session associated with a circuit-switched network, it is determined whether the active circuit-switched session is to be handed off from the circuit-switched network to a packet-switched network based on at least one handoff condition. When one of the at least one handoff condition is met, it is indicated that the active circuit-switched session is to be anchored in the packet-switched networks.

In an additional aspect, a mobile device is disclosed. The mobile device includes a processor and a memory coupled to the processor for storing data. The processor is configured to determine, during an active circuit-switched session associated with a circuit-switched network, whether the active circuit-switched session is to be handed off from the circuit-switched network to a packet-switched network based on at least one handoff condition. The processor is further configured to indicate, when one of the at least one handoff condition is met, that the active circuit-switched session is to be anchored in the packet-switched networks.

In another aspect, an apparatus operable in a wireless communication system is provided. The apparatus includes means for determining, during an active circuit-switched session associated with a circuit-switched network, whether the active circuit-switched session is to be handed off from the circuit-switched network to a packet-switched network based on at least one handoff condition, and means for indicating the active circuit-switched session to be anchored in the packet-switched networks when one of the at least one handoff condition is met.

In a further aspect, a computer-readable medium including instructions stored thereon is provided, which includes a first instruction set for, during an active circuit-switched session associated with a circuit-switched network, determining whether the active circuit-switched session is to be handed off from the circuit-switched network to a packet-switched network based on at least one handoff condition; and a second instruction set for indicating the active circuit-switched session to be anchored in the packet-switched networks when one of the at least one handoff condition is met.

In still a further aspect, a method of processing a session is provided. An indication that an active circuit-switched session is to be handed off to a packet-switched network is received. The active circuit-switched session is anchored so that the active circuit-switched session may be handed off to the packet-switched network.

In still a further aspect, an apparatus of processing a session is disclosed. The apparatus includes a processor and a memory coupled to the processor for storing data. The processor is configured to receive an indication that an active circuit-switched session is to be handed off to a packet-switched network and to anchor the active circuit-switched session so that the active circuit-switched session may be handed off to the packet-switched network.

In still a further aspect, an apparatus operable in a wireless communication system is provided. The apparatus includes means for receiving an indication that an active circuit-switched session is to be handed off to a packet-switched network, and means for anchoring the active circuit-switched session so that the active circuit-switched session may be handed off to the packet-switched network.

In still a further aspect, a computer-readable medium including instructions stored thereon is provided, which includes a first instruction set for receiving an indication that an active circuit-switched session is to be handed off to a packet-switched network, and a second instruction set for anchoring the active circuit-switched session so that the active circuit-switched session may be handed off to the packet-switched network.

It is understood that other embodiments of the present disclosure will become readily apparent to those skilled in the art from the following detailed description, wherein it is shown and described only various embodiments of the disclosure by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the disclosure and is not intended to represent the only embodiments in which the disclosure may be practiced. The detailed description includes specific details for the purpose of providing a thorough understanding of the disclosure. However, it will be apparent to those skilled in the art that the disclosure may be practiced without these specific details. In some instances, well known structures and components are shown in block diagram form in order to avoid obscuring the concepts of the disclosure.

In the following detailed description, various techniques will be described in connection with the handoff of a mobile user from one network to another. A number of these techniques will be described in the context of a mobile device or mobile station (MS) traveling through a circuit-switched (CS) cellular network with one or more packet-switched (PS) cellular network and/or wireless LANs dispersed throughout the cellular coverage region. The mobile device may include multiple communication protocols. For example, the mobile device may be a multifunctional device, providing email, Internet access, as well as traditional cellular communication. The mobile device may be equipped with wide area wireless connectivity, for example, utilizing the following technologies: third generation wireless or cellular systems (3G), Institute for Electrical and Electronic Engineers (IEEE) 802.16 (WiMax), and other to-be-defined Wireless Wide Area Network (WWAN) technologies. Meanwhile, IEEE 802.11 based wireless Local Area Network (wireless LAN) connectivity may be installed in the mobile device as well. On the horizon, ultra-wideband (UWB) and/or Bluetooth-based Wireless Personal Area Network (WPAN) local connectivity may also be available in the mobile device. The mobile device may be any suitable device capable of wireless telephony or data communications, such as a cellular phone designed for operation in a CDMA2000 1x network. The mobile device may be capable of employing any suitable protocol for accessing a Wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching within or between a CDMA2000 network and a GSM/UMTS network, or switching between a circuit-switched cellular network and a WiMax network. Accordingly, any reference to a cellular phone capable of communicating with an IEEE 802.11 network, or any other specific embodiment, is intended only to illustrate various aspects of the present disclosure, with the understanding that these aspects have a wide range of applications.

Figure 1A:
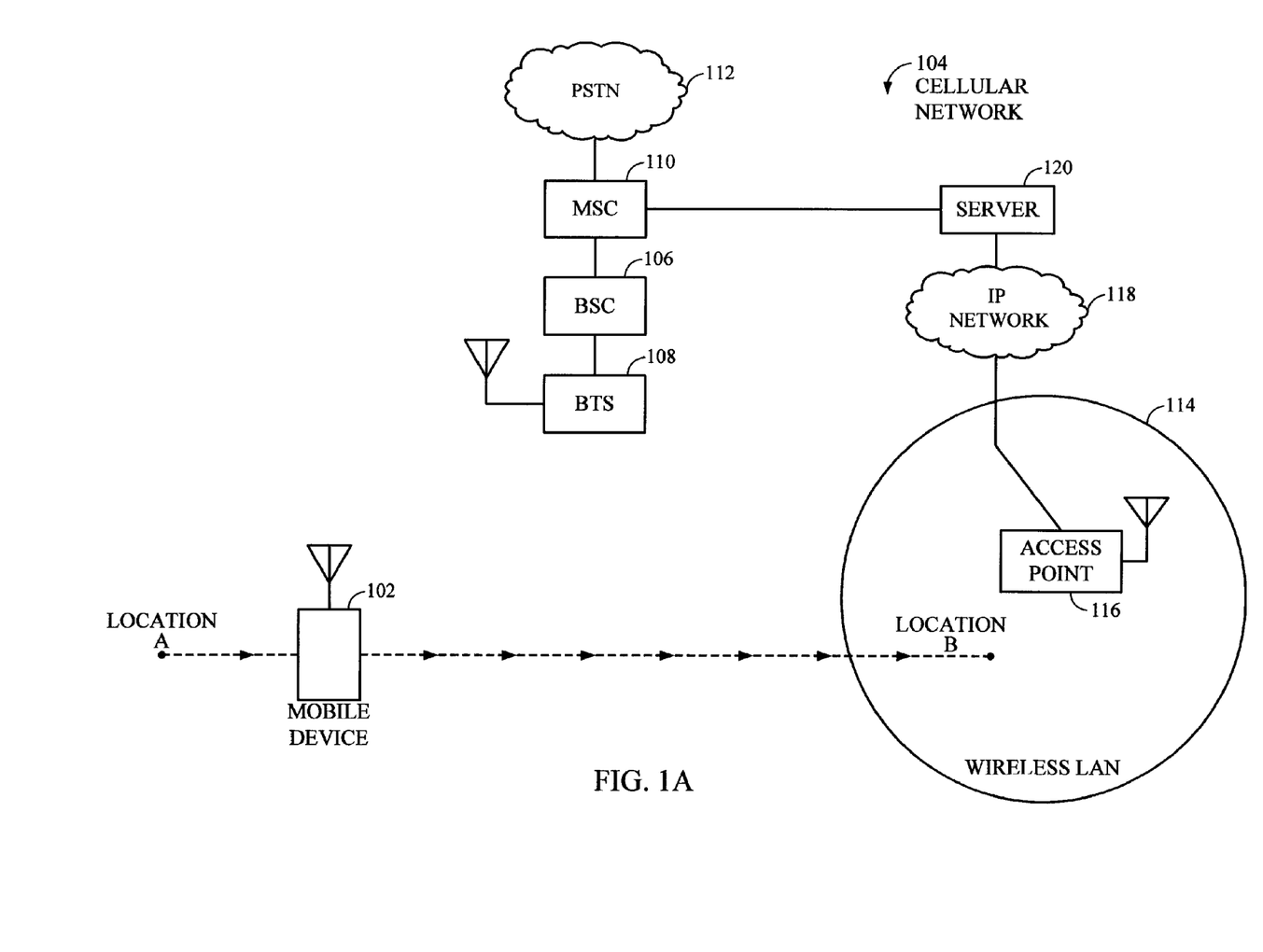
FIG. 1A is a conceptual block diagram of an exemplary wireless communications system.

FIG. 1A is a conceptual block diagram of an embodiment of a wireless communications system. A mobile device 102 is shown moving through a wide area cellular network 104 by a series of broken lines. The cellular network 104 includes a BSC 106 supporting a number of BTSs 108 dispersed throughout the cellular coverage region. A single BTS 108 is shown in FIG. 1A for simplicity of explanation. A mobile switching center (MSC) 110 may be used to provide a gateway to a public switched telephone network (PSTN) 112. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed in the cellular coverage region of the cellular network 104. A single wireless LAN 114 is shown in FIG. 1A as an example of any of a variety of packet-switched networks that may communicate with the mobile device 102. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112. It is noted that FIG. 1A does not illustrate all the possible communication pathways between the different systems and networks.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the cellular network 104 from location A to location B in the depicted embodiment, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120.

Figure 1B:
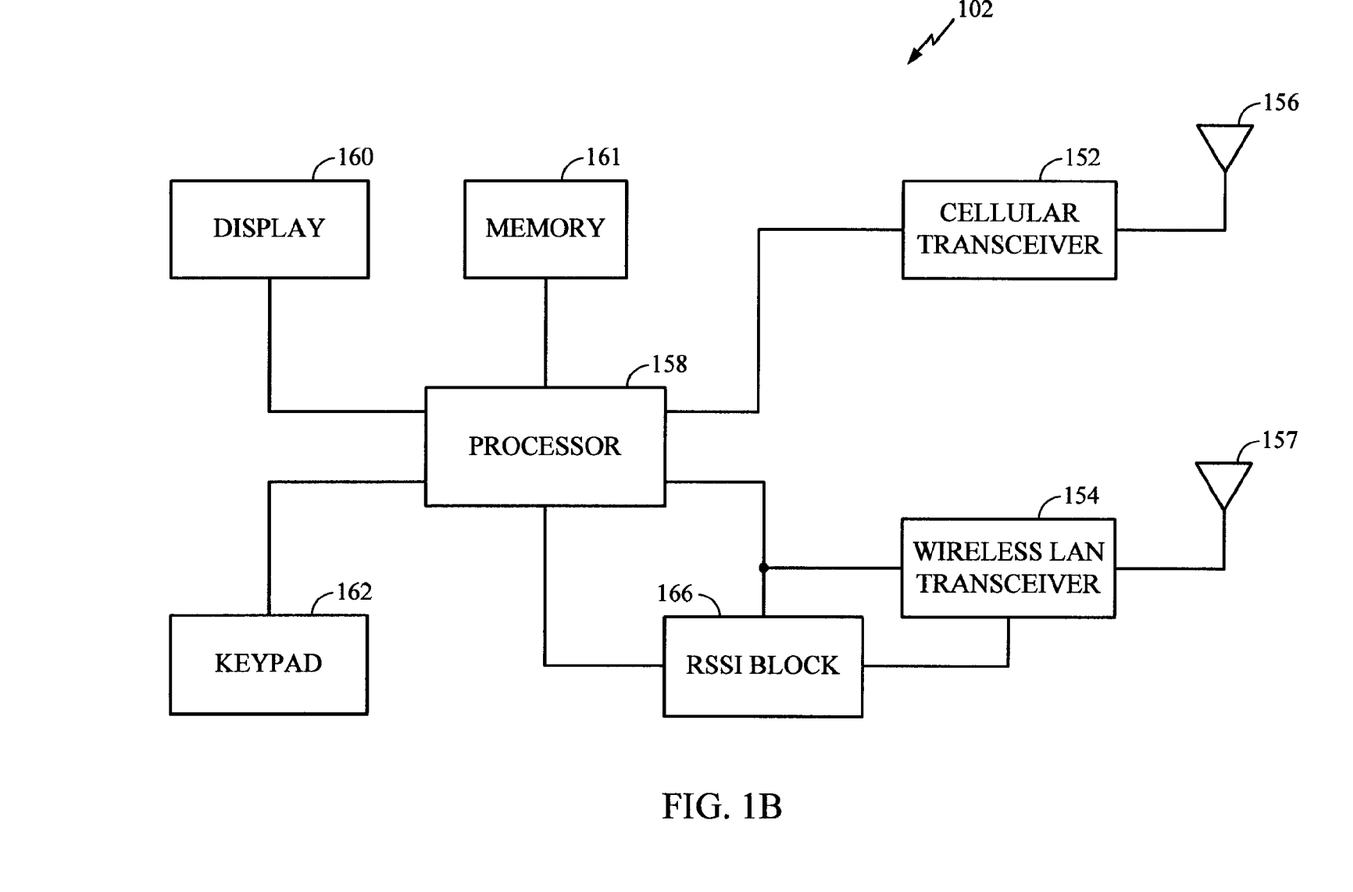
FIG. 1B is a functional block diagram illustrating an example of a mobile device capable of supporting both circuit-switched cellular and wireless LAN communications.

FIG. 1B is a functional block diagram illustrating an example of a mobile device capable of supporting both circuit-switched cellular and wireless LAN communications. The mobile device 102 may include a cellular transceiver 152 and a wireless LAN transceiver 154. In at least one embodiment of the mobile device 102, the cellular transceiver 152 is capable of supporting CDMA2000 1x communications with a BTS (not shown), and the wireless LAN transceiver 154 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 152, 154 is shown with a separate antenna 156, 157, respectively, but the transceivers 152, 154 may share a single broadband antenna. Each antenna 156, 157 may be implemented with one or more radiating elements.

The mobile device 102 is also shown with a processor 158 coupled to both transceivers 152, 154. However, a separate processor may be used for each transceiver in alternative embodiments of the mobile device 102. The processor 158 may be implemented as hardware, firmware, software, or any combination thereof. By way of example, the processor 158 may include a microprocessor (not shown). The microprocessor may be used to support software applications that, among other things, (1) control and manage access to the cellular network and wireless LAN, and (2) interface the processor 158 to a keypad 160, display, 162, and other user interfaces (not shown). The processor 158 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 158 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 166. The RSSI is most likely an existing signal that is fed back to the wireless LAN transceiver 152 for automatic gain control, and therefore, can be provided to the processor 158 without increasing the circuit complexity of the mobile device 102. Alternatively, the quality of the radio connection may be determined from the beacon.

The processor 158 may be configured to execute an algorithm to detect when handoff conditions exist and to initiate appropriate signaling with other connected systems. The algorithm may be implemented as one or more software applications supported by the microprocessor based architecture discussed earlier and stored in an accessible memory 161. Alternatively, the algorithm may be a module separate from the processor 158. The module may be implemented in hardware, software, firmware, or any combination thereof. Depending on the specific design constraints, the algorithm may be integrated into any entity in the mobile device 102, or distributed across multiple entities in the mobile device 102.

Figure 2:
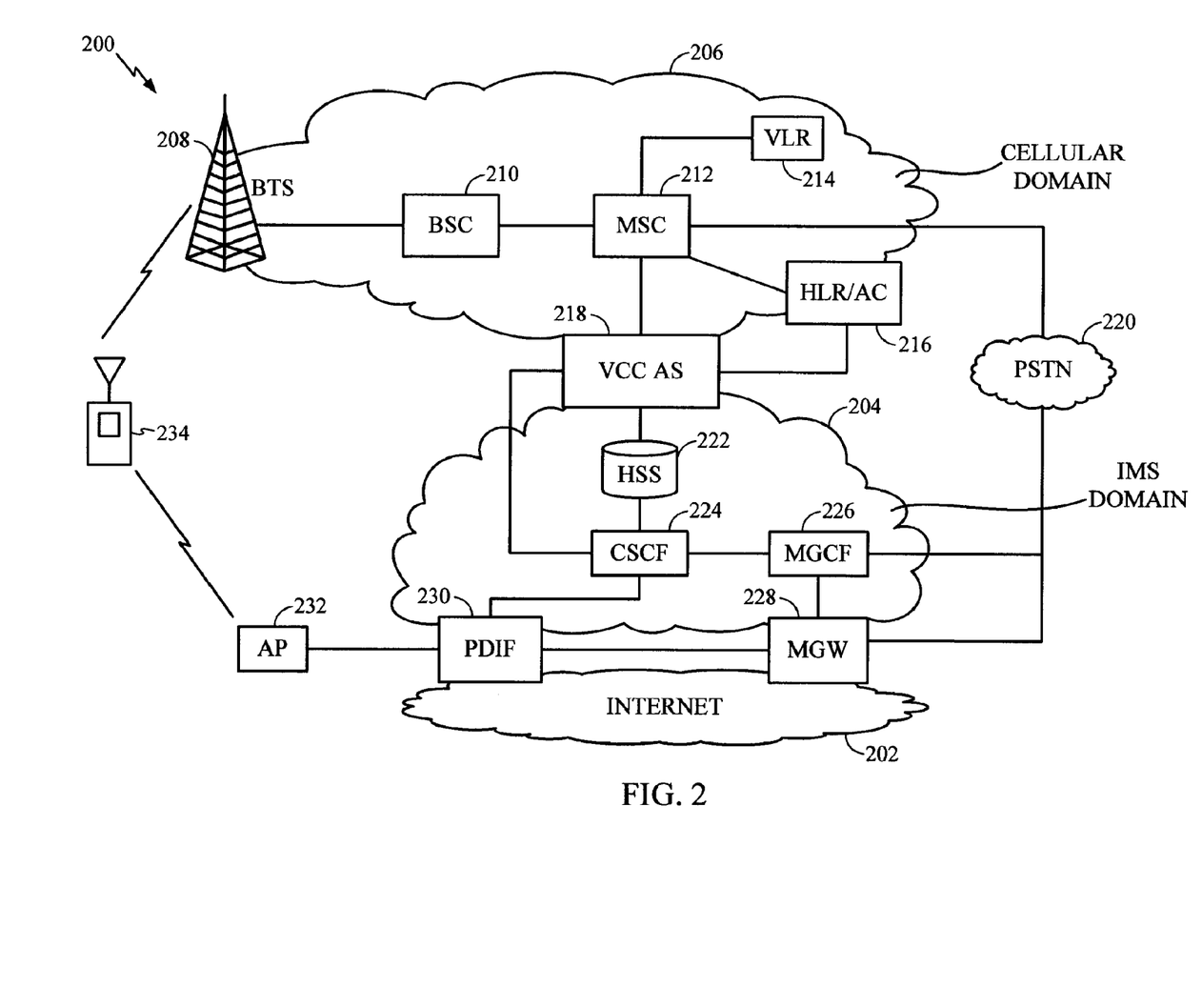
FIG. 2 is a conceptual block diagram of an exemplary communications system.

FIG. 2 depicts a conceptual block diagram of an exemplary communications system 200. The details of FIG. 2 are depicted as functional blocks and may be physically implemented in a variety of different ways. Each functional block may be one or more separate computer-based platforms for executing appropriate software or they may be logical functions of an application executing on the same computer-based platform.

The system 200 may include a mobile device 234, a cellular domain 206, an IP Multimedia Subsystem (IMS) domain 204, and the Internet 202. For example, the mobile device 234 may be the device 102 depicted in FIGS. 1A and 1B, and the cellular domain 206 may have components similar to the components of the cellular network 104 depicted in FIG. 1A. For example, the cellular domain 206 may include a BTS 208, a BSC 210, a MSC 212, a Visitor Location Register (VLR) 214, and a Home Location Register (HLR).

The IMS domain 204 may include a number of different servers providing different functions, for example: servers providing IP based services such as Session Initiation Protocol (SIP) servers and SIP registrars (known as Call Session Control Function, CSCF) 224, servers providing interworking with legacy PSTN networks such as MGCF (Media Gateway Control Function) 226 and MGW (Media Gateway) 228, servers providing interworking with CS cellular networks such as Voice Call Continuity Application Server (VCC AS) 218. An VCC AS may also be referred to as Call Continuity Control Function (VCC AS). Also, a plurality of multimedia Application servers (not shown) can be included that provide different services to the mobile device 234 via the Internet 202. The specific servers identified in FIG. 2 are exemplary in nature and fewer or more servers can be included without departing from the scope of the present disclosure.

In general, one function of the IMS domain 204 is that of mapping signaling and voice communications between a packet-switched network and the circuit-switched network 206 to thereby permit communications between the two. The IMS domain 204 may, for example, provide a SIP based network connection for a mobile device 234. The Session Initiation Protocol (SIP) is a signaling protocol used for establishing sessions in an IP network. A session may be a simple two-way telephone call or it may be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 is the inclusion of a Home Subscriber Server (HSS) 222, which may serve the same function as the Home Location Register (HLR) 216 in legacy circuit-switched networks, and the connection between the PSTN 220 and the IMS domain 204. In the FIG. 2 also shown is a path between BSC (210) and VCC AS 218 through the MSC 212. On the wireless LAN side, the mobile device 234 may use an Access Point 232 to reach a Packet Data Interworking Function (PDIF) 230 within the IMS domain 204.

In particular, the MGW 228 may convert transmissions between a packet stream from the IP network and the voice circuit-switched network such as the PSTN 220. Thus, voice is carried in packets over the packet-switched network and the MGW 228, while voice is carried over voice encoded communication circuits in a circuit-switched connection between the MGW 228 and the PSTN 220. The MGCF 226 may operate to terminate SIP signaling and control functions of the MGW 228. In this regard, the MGCF 226 typically performs conversion between SIP signaling in the IP session and SS7 signaling in the circuit-switched session.

The VCC AS 218 may anchor certain communication sessions. The VCC AS may be an application that enables call continuity as a user moves back and forth between a cellular network and WLAN. It supports autonomous and user-directed handover based on policies defined by the operator and applied in real time. The VCC AS may be part of a service that a network operator may provide to its subscribers. This service may be automatically included as a service or be a subscription service which a user may select and possibly pay additional fees for its capabilities. Original designs of a multimode network such as that in FIG. 1A envisioned static anchoring. That is, each time a mobile device initiated a circuit-switched call, then (if they are a subscriber to the VCC service) that call session would be anchored at the VCC AS upon call initiation, whether or not that call session need be handed off to the packet-switched network such as WLAN, or the like. Anchoring involves the VCC AS storing sufficient information to restore or handoff a session if it becomes necessary. Typically such information includes the identity of the two parties participating in the session, the services being utilized during the session, and any transport specific information that is useful in defining the state of the network and the call during the session. Such a design of static anchoring automatically anchors all calls upon initiation, regardless of whether that call ever actually requires handoff. Accordingly, resources of the VCC AS 218 may be used for calls that do not require its functionality. Additionally, the procedure of anchoring the call may add a delay to the setup of the circuit-switched session which may be noticeable to a user.

In known systems, for CS-to-WLAN handoffs, an attempt to anchor all CS calls on the VCC AS at call origination is made. This implies that all CS calls originating from a CS/WLAN dual-mode mobile device need be anchored at the VCC AS, regardless of whether they are to be handed off to WLAN or not. Such a static anchoring scheme is inefficient since it may impose a resource overhead on the VCC AS and add to the complexity of that entity.

In certain aspects, the present dynamic anchoring attempts to solve this problem by selecting a VCC AS only when a handoff is deemed necessary by the mobile device. The dynamic anchoring mechanism is invoked when a mobile device decides that a CS call needs to be handed over to a PS call over Wireless LAN. The VCC AS is added to the call path only when a handoff is deemed necessary by the mobile device. The handoff process may make use of the existing conferencing capabilities of a MSC.

Figure 3:
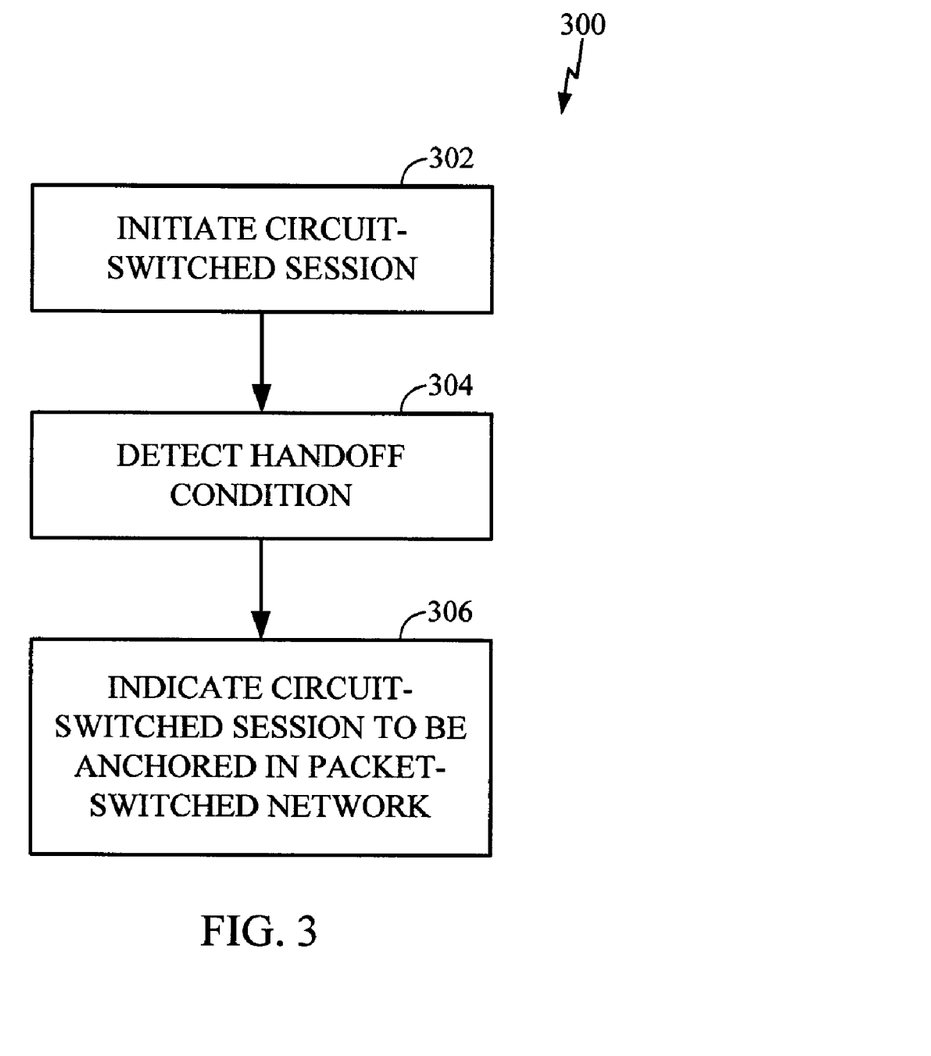
FIG. 3 is a flowchart of an exemplary method of dynamic anchoring sessions.

FIG. 3 depicts a flowchart of an exemplary method 300 for anchoring sessions that varies significantly from the conventional static anchoring design. In accordance with the method 300 of FIG. 3, anchoring occurs on a dynamic basis when needed. As a result, system resources of the VCC AS 218 depicted in FIG. 2 are used more efficiently. A mobile device may initiate a circuit-switched session such as a conventional voice telephone call or the like 302. During this session, however, the mobile device may detect that a handoff condition exists 304. A handoff condition occurs when the mobile device determines that a packet-switched access network is available for handling the current session. More particularly, during the ongoing circuit-switched session, the mobile device may determine that it has entered the coverage area of a packet-switched network and that this network may be suited for handling the current circuit-switched session. One of ordinary skill will recognize that there are many functionally equivalent ways for the handset to determine when it is appropriate to transfer from the accessing the circuit-switched network to accessing the packet-switched network.

Regardless of the method for determining a handoff condition exists, when such a condition is detected, the mobile device may indicate the active circuit-switched session is to be anchored in the packet-switched network 306. For example, the mobile device may indicate that the active circuit-switched session is to be anchored to the VCC AS. In an exemplary embodiment, the mobile station may send a trigger signal to the VCC AS, informing it that the handoff condition exists. In response to receiving the trigger signal, the VCC AS may take the steps necessary to anchor the session. Optionally, the handoff from the circuit-switched session to a packet-switched session may be implemented.

To anchor a call, the VCC AS needs the specifics of the call such as the parties involved in the call (e.g., their addresses) as well as the characteristics of the session such as the codec in use. In the conventional architecture where the call is anchored at the call set up, the VCC AS collects this information at the call set up. To ensure this, the call set up signaling is always routed through VCC AS. This signaling is relayed to the VCC AS by SIP signaling. In an aspect of the present dynamic anchoring scheme, the mobile device may decide to anchor the call prior to handoff and perform the signaling with the VCC AS to anchor the call. The mobile device may use a variety of transports to convey this signaling explicitly to the VCC AS. For example, the mobile device may use the SIP protocol, or cellular messaging such as SMS, or in band signaling such as DTMF, or the like. Alternatively, the anchoring may be performed implicitly by simply placing a call to the VCC AS. The VCC AS may derive necessary information by inspecting the calling party address, dial strings, and the like used during the call set up.

Thus, utilizing the method 300 of FIG. 3, only those sessions that are to be handed off are actually anchored. If a session never experiences a handoff condition, then that session is not anchored. As compared to the static anchoring scheme, this dynamic anchoring of sessions may more efficiently utilize the resources of the VCC AS.

Figure 4:
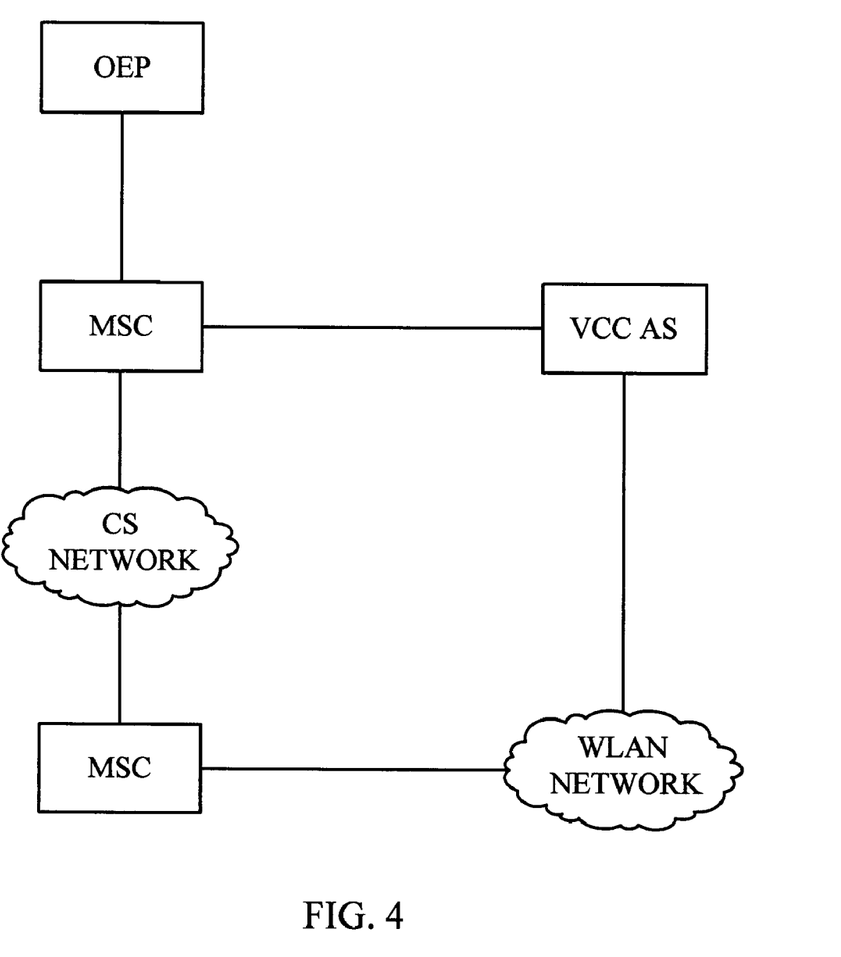
FIG. 4 is a schematic diagram showing an exemplary system in which dynamic anchoring sessions may occur.

FIG. 4 is a schematic diagram showing an exemplary system in which dynamic anchoring sessions may occur. In one exemplary aspect, there is no change in the procedure when a dual-mode (e.g., cellular/WiFi) mobile device or mobile station (MS) originates a CS call. The call flow remains the same: from the MS to the Other End Point (OEP) via the CS network and the MSC. The OEP may be another mobile device or the like. The VCC AS is not aware of any CS call originations from the dual-mode MS.

The dynamic anchoring mechanism is invoked when the MS determines that the CS call is to be handed over to a packet-switched (PS) call over WLAN. This decision may be based on any number of reasons including, but not limited to, signal quality, loading on the WWAN, or the like. The mechanism is independent of the algorithm used to trigger such a handoff.

A second CS call is set up between the MS and the VCC AS via the CS network and the MSC. In certain aspects, this can be done in two ways, although other ways may be utilized as well. The two ways may differ in behavior depending on billing policy (e.g., whether a conference call is to be dropped when the caller drops out of the call). The MS may initiate the second CS call to the VCC AS, using a provisioned VCC AS number. Alternatively, the VCC AS may originate the CS call to the MS. This assumes that the VCC AS has a way to know that a handoff is necessary. This can be achieved, for example, by a signal from the MS to the VCC AS through the WLAN interface.

The MS may conference the original CS call with this second CS call. It may use existing three-way call features to accomplish this. The conference is hosted by the MSC and has the MS, the VCC AS, and the OEP as participants. That is, the conferencing establishes a media path between the OEP and the VCC AS through the MSC.

The MS then initiates a packet-based wireless communication (e.g., a VoIP call) to the VCC AS over the WLAN interface. Using the Session Initiation Protocol (SIP) Call-ID and perhaps another special SIP header, the VCC AS recognizes that the VoIP call is intended to replace the original existing CS call on the MS. The SIP headers may also enable the VCC AS to identify the conference call leg that is connected to the MS and the OEP.

The VCC AS adds the VoIP call to the existing conference. At this point, a connection is established between the MS and the OEP via the WLAN, the VCC AS, and the MSC.

The MS may then drop its original CS call and may continue to communicate with the OEP via the VCC AS. Whether the MS is the originator of the CS conference call may determine what happens after the MS drops the original CS call. An oft-used billing policy is to terminate the conference call when the caller drops out. If the MS has initiated the second CS call, such a policy may disconnect the OEP and the VCC AS when the MS terminates this call. On the other hand, if the VCC AS has initiated the second CS call, the MS terminating the call may have no effect.

Figure 5:
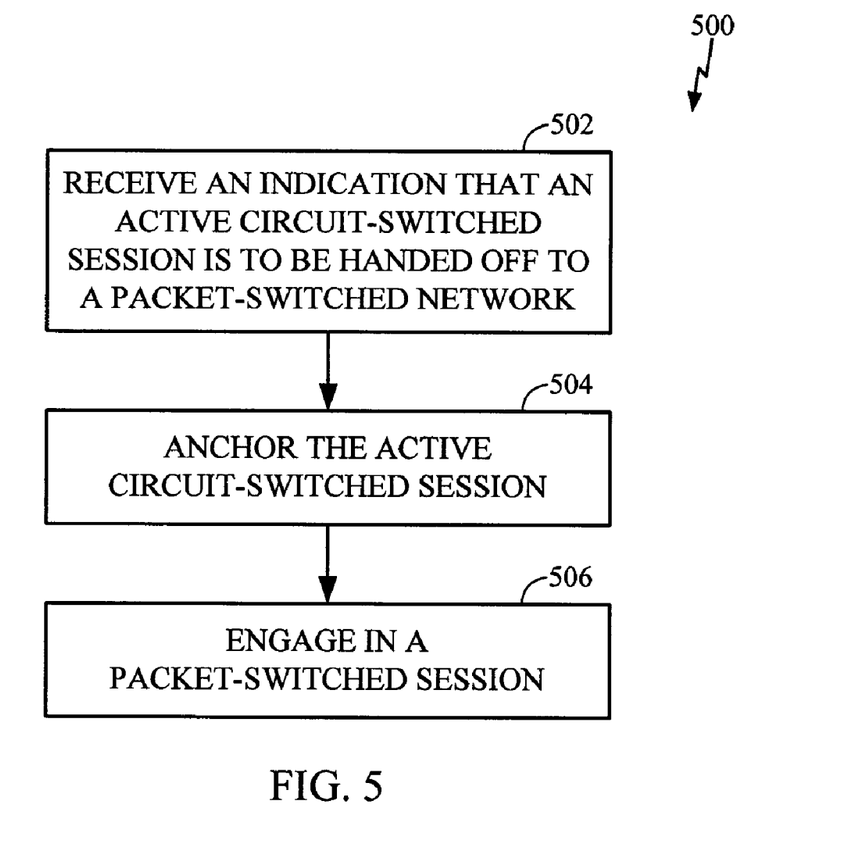
FIG. 5 is a flowchart of an exemplary method of processing a session.

FIG. 5 is a flowchart of an exemplary method 500 of processing a session. The method 500 may be performed by the VCC AS 218 shown in FIG. 2. The VCC AS 218 may include a processor (not shown) and a memory (not shown) coupled to the processor for storing data. The processor of the VCC AS 218 may be configured to implement the method 500. An indication that an active circuit-switched session is to be handed off to a packet-switched network is received 502. For example, the indication may be received by the VCC AS. The active circuit-switched session is anchored so that the active circuit-switched session may be handed off to the packet-switched network 504. For example, the active circuit-switched session may be anchored by the VCC AS. The VCC AS may engage in a packet-switched session 506. The packet-switched session may be used to replace the active circuit-switched session. The packet-switched session may be recognized using a Session Initiation Protocol (SIP) Call-ID or a different SIP header.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. A computer-readable medium may be coupled to the processor such that the processor can read information from, and write information to, the computer-readable medium. In the alternative, the computer-readable medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for processing a session associated with a mobile device capable of communicating over at least two networks, comprising:
during an active circuit-switched session between the mobile device and a circuit switched network, determining whether the active circuit-switched session is to be handed off from the circuit-switched network to a packet-switched network based on at least one handoff condition, wherein the at least one handoff condition comprises information relating to a network load;
indicating that the active circuit-switched session is to be anchored at a server in the packet-switched network that provides interworking with the circuit switched network only when one of the at least one handoff condition is met, wherein the active circuit-switched session is not anchored at the server when the at least one handoff condition is not met;
receiving at the mobile device a call from the server through the circuit-switched network in response to the indication in order to establish a new circuit-switched session with the server;
merging the active circuit-switched session with the new circuit-switched session with the server; and
establishing a packet-switched session over the packet-switched network with the server, wherein the server merges the active circuit-switched session, the packet-switched session and the new circuit-switched session in order to hand off the active circuit-switched session from the circuit-switched network to the packet-switched network.

2. The method of claim 1, wherein the indicating that the active circuit-switched session is to be anchored at the server comprises sending a trigger signal to the packet-switched network.

3. The method of claim 2, wherein the establishing of the packet-switched session over the packet-switched network further comprises receiving a call from a Voice Call Continuity Application Server (VCC AS) in the packet-switched network in response to the trigger signal.

4. The method of claim 1, wherein the packet-switched session is used to replace the active circuit-switched session.

5. The method of claim 4, further comprising:
dropping the active circuit-switched session.

6. The method of claim 4, wherein the packet-switched session is recognized using at least one of a Session Initiation Protocol (SIP) Call-ID or a different SIP header.

7. The method of claim 1, wherein the mobile device is a cellular/WiFi handset.

8. The method of claim 1, wherein the anchoring comprises one of storing an identity for each of two or more parties participating in the active circuit-switched session, and a characteristic of the active circuit-switched session.

9. The method of claim 1, wherein the establishing of the packet-switched session over the packet-switched network further comprises initiating a call to a Voice Call Continuity Application Server (VCC AS) in the packet-switched network using a provisioned VCC AS number.

10. The method of claim 1, wherein merging the active circuit-switched session with the received call from the server comprises using a three-way call feature of the mobile device to conference the active-circuited switched session with the received call.

11. The method of claim 1, wherein the server is a Voice Call Continuity Application Server (VCC AS).

12. A mobile device, comprising:
a processor configured to:
during an active circuit-switched session between the mobile device and a circuit switched network, determine whether the active circuit-switched session is to be handed off from the circuit-switched network to a packet-switched network based on at least one handoff condition, wherein the at least one handoff condition comprises information relating to a network load;
indicate that the active circuit-switched session is to be anchored at a server in the packet-switched network that provides interworking with the circuit switched network only when one of the at least one handoff condition is met, wherein the active circuit-switched session is not anchored at the server when the at least one handoff condition is not met;
receive at the mobile device a call from the server through the circuit-switched network in response to the indication in order to establish a new circuit-switched session with the server;
merge the active circuit-switched session with the new circuit-switched session with the server; and
establish a packet-switched session over the packet-switched network with the server, wherein the server merges the active circuit-switched session, the packet-switched session and the new circuit-switched session in order to hand off the active circuit-switched session from the circuit-switched network to the packet-switched network; and
a memory coupled to the processor for storing data associated with the at least one handoff condition.

13. The mobile device of claim 12, wherein the packet-switched session used to replace the active circuit-switched session.

14. The mobile device of claim 13, wherein the processor is further configured to drop the active circuit-switched session.

15. The mobile device of claim 13, wherein the packet-switched session is recognized using at least one of a Session Initiation Protocol (SIP) Call-ID or a different SIP header.

16. The mobile device of claim 12, wherein the mobile device is a cellular/WiFi handset.

17. The mobile device of claim 12, wherein the active circuit-switched session is anchored based on an identity for each of two or more parties participating in the active circuit-switched session, or a characteristic of the active circuit-switched session.

18. The mobile device of claim 12, further comprising a provisioned Voice Call Continuity Application Server (VCC AS) number corresponding to a VCC AS in the packet-switched network, and wherein the processor is further configured to initiate a call to the VCC AS using the provisioned VCC AS number to establish the packet-switched session over the packet-switched network.

19. The mobile device of claim 12, wherein the processor is further configured to:
send a trigger signal to the packet-switched network indicating the active circuit-switched session is to be anchored at the server,
receive a call from a Voice Call Continuity Application Server (VCC AS) in the packet-switched network in response to the trigger signal to establish the packet-switched session over the packet-switched network.

20. The mobile device of claim 12, wherein the processor is further configured to merge the active circuit-switched session with the received call from the server using a three-way conference call feature of the mobile device to conference the active-circuited switched session with the received call from the server.

21. The mobile device of claim 12, wherein the server is a Voice Call Continuity Application Server (VCC AS).

22. An apparatus operable in a wireless communication system, the apparatus comprising:
during an active circuit-switched session associated between a mobile device and a circuit switched network, means for determining whether the active circuit-switched session is to be handed off from the circuit-switched network to a packet-switched network based on at least one handoff condition, wherein the at least one handoff condition comprises information relating to a network load;
means for indicating that the active circuit-switched session is to be anchored at a server in the packet-switched network that provides interworking with the circuit switched network only when one of the at least one handoff condition is met, wherein the active circuit-switched session is not anchored at the server when the at least one handoff condition is not met;
means for receiving at the mobile device a call from the server through the circuit-switched network in response to the indication in order to establish a new circuit-switched session with the server;
means for merging the active circuit-switched session with the new circuit-switched session with the server; and
means for establishing a packet-switched session over the packet-switched network with the server, wherein the server merges the active circuit-switched session, the packet-switched session and the new circuit-switched session in order to hand off the active circuit-switched session from the circuit-switched network to the packet-switched network.

23. The apparatus of claim 22, wherein the means for indicating that the active circuit-switched session is to be anchored at the server comprises means for sending a trigger signal to the packet-switched network.

24. The apparatus of claim 22, wherein the packet-switched session is used to replace the active circuit-switched session.

25. The apparatus of claim 24, further comprising:
means for dropping the active circuit-switched session.

26. The apparatus of claim 24, wherein the packet-switched session is recognized using at least one of a Session Initiation Protocol (SIP) Call-ID or a different SIP header.

27. The apparatus of claim 22, wherein the apparatus is a cellular/WiFi handset.

28. The apparatus of claim 22, wherein the means for merging the active circuit-switched session with the received call from the server comprises means for using a three-way conference call feature of the mobile device to conference the active-circuited switched session with the received call from the server.

29. The apparatus of claim 22, wherein the server is a Voice Call Continuity Application Server (VCC AS).

30. A non-transitory computer-readable medium including instructions stored thereon for processing a communication session, comprising:
a first instruction set for, during an active circuit-switched session between a mobile device and a circuit switched network, determining whether the active circuit-switched session is to be handed off from the circuit-switched network to a packet-switched network based on at least one handoff condition, wherein the at least one handoff condition comprises information relating to a network load;
a second instruction set for indicating that the active circuit-switched session is to be anchored at a server in the packet-switched network that provides interworking with the circuit switched network only when one of the at least one handoff condition is met, wherein the active circuit-switched session is not anchored at the server when the at least one handoff condition is not met;
a third instruction set for receiving at the mobile device a call from the server through the circuit-switched network in response to the indication in order to establish a new circuit-switched session with the server;
a fourth instruction set for merging the active circuit-switched session with the new circuit-switched session with the server; and
a fifth instruction set for establishing a packet-switched session over the packet-switched network with the server, wherein the server merges the active circuit-switched session, the packet-switched session and the new circuit-switched session in order to hand off the active circuit-switched session from the circuit-switched network to the packet-switched network.

31. The non-transitory computer-readable medium of claim 30, wherein the second instruction set for indicating the active circuit-switched session to be anchored at the server comprises a sixth instruction set for sending a trigger signal to the packet-switched network.

32. The non-transitory computer-readable medium of claim 30, wherein the packet-switched session is used to replace the active circuit-switched session.

33. The non-transitory computer-readable medium of claim 32, further comprising:
a seventh instruction set for dropping the active circuit-switched session.

34. The non-transitory computer-readable medium of claim 32, wherein the packet-switched session is recognized using at least one of a Session Initiation Protocol (SIP) Call-ID or a different SIP header.

35. The non-transitory computer-readable medium of claim 30, wherein the fourth instruction set for merging the active circuit-switched session with the received call from the server comprises a eight instruction set for using a three-way conference call feature of the mobile device to conference the active-circuited switched session with the received call from the server.

36. The computer-readable medium of claim 30, wherein the server is a Voice Call Continuity Application Server (VCC AS).

37. A method of processing a communication session, comprising:
receiving at a server an indication that an active circuit-switched session between a mobile device and a circuit switched network is to be handed off to a packet-switched network, whether the active circuit-switched session is to be handed off from the circuit-switched network to the packet-switched network based on at least one handoff condition, wherein the at least one handoff condition comprises information relating to a network load;
anchoring the active circuit-switched session at the server in the packet-switched network, so that the active circuit-switched session may be handed off to the packet-switched network, wherein the server provides interworking with the circuit switched network, and wherein anchoring includes:
receiving at the server an indication that the active circuit-switched session is to be anchored at the server in the packet-switched network only when one of the at least one handoff condition is met, wherein the active circuit-switched session is not anchored at the server when the at least one handoff condition is not met;
initiating a call from the server to the mobile device through the circuit-switched network in response to the indication in order to establish a new circuit-switched session with the mobile device;
merging the active circuit-switched session with the new circuit-switched session; and
establishing a packet-switched session over the packet-switched network between the mobile device and the server, wherein the server merges the active circuit-switched session, the packet-switched session and the new circuit-switched session in order to hand off the active circuit-switched session from the circuit-switched network to the packet-switched network.

38. The method of claim 37, wherein the packet-switched session is used to replace the active circuit-switched session.

39. The method of claim 38, wherein the packet-switched session is recognized using at least one of a Session Initiation Protocol (SIP) Call-ID or a different SIP header.

40. The method of claim 37, wherein the server is a Voice Call Continuity Application Server (VCC AS).

41. The method of claim 37, wherein the anchoring comprises one of storing an identity for each of two or more parties participating in the active circuit-switched session, and a characteristic of the active circuit-switched session.

42. The method of claim 37, wherein the establishing of the packet-switched session over the packet-switched network further comprises receiving a call at a provisioned VCC AS number corresponding to a Voice Call Continuity Application Server (VCC AS) in the packet-switched network.

43. The method of claim 37, wherein the indication comprises a trigger signal indicating the active circuit-switched session is to be anchored at the server, wherein the establishing of the packet-switched session over the packet-switched network further comprises originating a call from a Voice Call Continuity Application Server (VCC AS) in the packet-switched network in response to the trigger signal.

44. The method of claim 37, wherein merging the active circuit-switched session with the received call from the server comprises using a three-way conference call feature of the mobile device to conference the active-circuited switched session with the received call from the server.

45. An apparatus of processing a communication session, comprising:
a processor configured to:
receive at a server an indication that an active circuit-switched session between a mobile device and a circuit switched network is to be handed off to a packet-switched network, whether the active circuit-switched session is to be handed off from the circuit-switched network to the packet-switched network based on at least one handoff condition, wherein the at least one handoff condition comprises information relating to a network load;
anchor the active circuit-switched session at the server in the packet-switched network, so that the active circuit-switched session may be handed off to the packet-switched network, wherein the server provides interworking with the circuit switched network;
initiate a call from the server to the mobile device through the circuit-switched network in order to establish a new circuit-switched session with the mobile device;
merge the active circuit-switched session with the new circuit-switched session with the server; and
establish a packet-switched session over the packet-switched network with the server, wherein the server merges the active circuit-switched session, the packet-switched session and the new circuit-switched session in order to hand off the active circuit-switched session from the circuit-switched network to the packet-switched network; and
a memory coupled to the processor for storing data associated with the at least one handoff condition.

46. The apparatus of claim 45, wherein the packet-switched session is used to replace the active circuit-switched session.

47. The apparatus of claim 46, wherein the packet-switched session is recognized using at least one of a Session Initiation Protocol (SIP) Call-ID or a different SIP header.

48. The apparatus of claim 45, wherein the server is a Voice Call Continuity Application Server (VCC AS).

49. The apparatus of claim 45, wherein the processor is further configured to anchor the active circuit-switched session based on storing an identity for each of two or more parties participating in the active circuit-switched session, or based on a characteristic of the active circuit-switched session.

50. The apparatus of claim 45, further comprising a provisioned Voice Call Continuity Application Server (VCC AS) number corresponding to a VCC AS in the packet-switched network, and wherein the processor is further configured to receive a call at the provisioned VCC AS number corresponding to the VCC AS.

51. The apparatus of claim 45, wherein the indication comprises a trigger signal indicating the active circuit-switched session is to be anchored at the server, and wherein the processor is further configured to transmit a call from a Voice Call Continuity Application Server (VCC AS) in the packet-switched network in response to the trigger signal to establish the packet-switched session over the packet-switched network.

52. The apparatus of claim 45, wherein the processor is further configured to merge the active circuit-switched session with the received call from the server using a three-way conference call feature of the mobile device to conference the active-circuited switched session with the received call from the server.

53. An apparatus operable in a wireless communication system, the apparatus comprising:
means for receiving at a server an indication that an active circuit-switched session between a mobile device and a circuit switched network is to be handed off to a packet-switched network, whether the active circuit-switched session is to be handed off from the circuit-switched network to the packet-switched network based on at least one handoff condition, wherein the at least one handoff condition comprises information relating to a network load;
means for anchoring the active circuit-switched session at the server in the packet-switched network, so that the active circuit-switched session may be handed off to the packet-switched network, wherein the server provides interworking with the circuit switched network;

means for initiating a call from the server to the mobile device through the circuit-switched network in order to establish a new circuit-switched session with the server;

means for merging the active circuit-switched session with the new circuit-switched session with the mobile device; and means for establishing a packet-switched session over the packet-switched network between the mobile device and the server, wherein the server merges the active circuit-switched session, the packet-switched session and the new circuit-switched session in order to hand off the active circuit-switched session from the circuit-switched network to the packet-switched network.

54. The apparatus of claim 53, wherein the packet-switched session is used to replace the active circuit-switched session.

55. The apparatus of claim 54, wherein the packet-switched session is recognized using at least one of a Session Initiation Protocol (SIP) Call-ID or a different SIP header.

56. The apparatus of claim 53, wherein the server is a Voice Call Continuity Application Server (VCC AS).

57. The apparatus of claim 53, wherein the means for merging the active circuit-switched session with the received call from the server comprises means for using a three-way conference call feature of the mobile device to conference the active-circuited switched session with the received call from the server.

58. A non-transitory computer-readable medium including instructions stored thereon for processing a communication session, comprising:

a first instruction set for receiving at a server an indication that an active circuit-switched session between a mobile device and a circuit switched network is to be handed off to a packet-switched network, whether the active circuit-switched session is to be handed off from the circuit-switched network to the packet-switched network based on at least one handoff condition, wherein the at least one handoff condition comprises information relating to a network load;

a second instruction set for anchoring the active circuit-switched session at the server in the packet-switched network so that the active circuit-switched session may be handed off to the packet-switched network, wherein the server provides interworking with the circuit switched network;

a third instruction set for initiating a call from the server to the mobile device through the circuit-switched network in order to establish a new circuit-switched session with the mobile device;

a fourth instruction set for merging the active circuit-switched session with the new circuit-switched session with the server; and a fifth instruction set for establishing a packet-switched session over the packet-switched network between the mobile device and the server, wherein the server merges the active circuit-switched session, the packet-switched session and the new circuit-switched session in order to hand off the active circuit-switched session from the circuit-switched network to the packet-switched network.

59. The non-transitory computer-readable medium of claim 58, wherein the packet-switched session is used to replace the active circuit-switched session.

60. The non-transitory computer-readable medium of claim 59, wherein the packet-switched session is recognized using at least one of a Session Initiation Protocol (SIP) Call-ID or a different SIP header.

61. The non-transitory computer-readable medium of claim 58, wherein the server is a Voice Call Continuity Application Server (VCC AS).

62. The non-transitory computer-readable medium of claim 58, wherein the fourth instruction set for merging the active circuit-switched session with the received call from the server comprises a eight instruction set for using a three-way conference call feature of the mobile device to conference the active-circuited switched session with the received call from the server.

* * * * *